Aug. 4, 1959  J. S. COURTNEY  2,897,565
DIAPER PIN
Filed May 28, 1958

INVENTOR

John S. Courtney

United States Patent Office 2,897,565
Patented Aug. 4, 1959

2,897,565

DIAPER PIN

John S. Courtney, Grafton, W. Va.

Application May 28, 1958, Serial No. 738,560

1 Claim. (Cl. 24—157)

This invention relates to fasteners and more particularly to a safety fastener for diapers.

It is an object of the present invention to provide a quick acting and completely safe diaper fastener which can be quickly applied and removed from diapers with a single hand and which will prevent accidental injury to the child.

Another object of the present invention is to provide a safety fastener for diapers of the above type in which the pin portion of the fastener is completely enclosed between solid base members at all times, out of contact with the skin of the infant so as to avoid discomfort and accidental pricking of the child.

Other objects of the invention are to provide a diaper pin bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
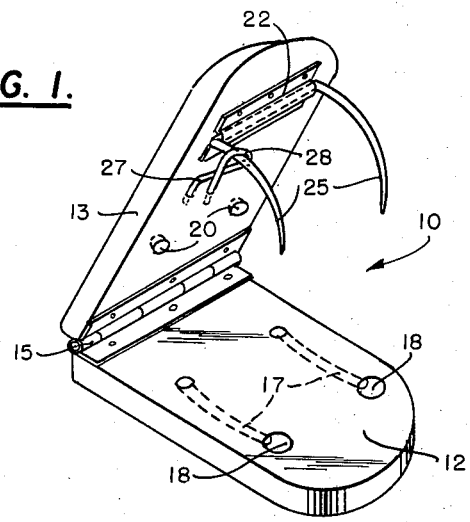
Figure 1 is a perspective view of a diaper pin made in accordance with one form of the present invention in an open position.
Figure 2:
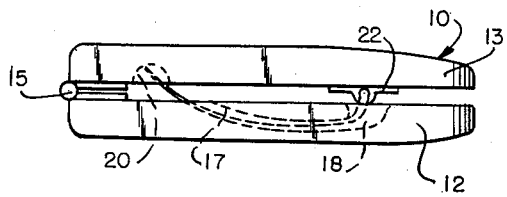
Figure 2 is a side elevational view of the diaper pin shown in Figure 1 in a closed position.

Referring now more in detail to the drawing, and more particularly to Figures 1 and 2 thereof, a safety fastener device 10 made in accordance with the present invention is shown to include a main base member 12 and a complementary base member 13, both preferably constructed of metal or molded plastic material and hingedly connected together at one base end by means of a snap spring hinge unit 15 that yieldably resists movement of the base members out of a normally closed position illustrated in Figure 2 and out of an adjusted open position illustrated in Figure 1.

The main base member 12 is provided with a pair of longitudinally extending, spaced apart, and parallel arcuate bores 17 having a large flair 18 at the distal end thereof relative to the hinge 15. The proximal end of the bores 17 communicate with shallow recesses 20 in the complementary base member 13 when the base members are in the close position illustrated in Figure 2.

A plate 22 extending across the distal end of the complementary base member 13 relative to the hinge 15 pivotally supports a pair of arcuate pins 25 that are supported thereon for limited pivotal movement between an open and closed position. A limit spring 27 embedded within the complementary base member 13 has a loop 28 encircling one of the pins 25 to limit outward movement thereof when in the open position illustrated in Figure 1. Thus, the pins 25 are maintained in the proper position at all times so that they will enter the flaired openings 18 of the bores 17 during closing movement of the base members, whereby the pointed ends of the pins will be automatically received within the recesses 20 of the complementary base member. Sufficient space is provided between the base members to accommodate several thicknesses of a diaper or other similar material. Of great importance, however, is the fact that it is virtually impossible to open the pins 25 or fastener 10 until the base members are actually pulled apart, during which time the pins 25 will withdraw outwardly through the arcuate bores 17 and the spring hinge 15 will maintain the parts in the open position shown in Figure 1, whereby the device is ready for the next use.

Figure 3:
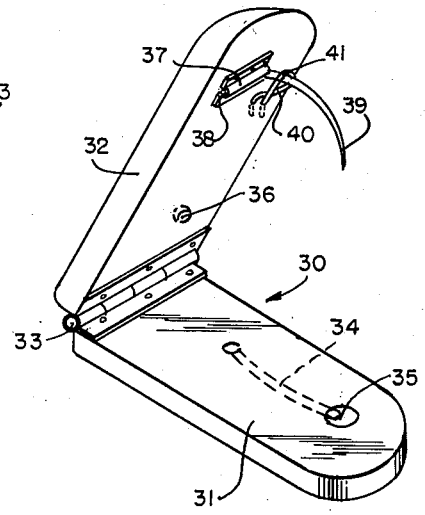
Figure 3 is a perspective view of a slightly modified form of construction.

In Figure 3 of the drawing, a slightly modified form of construction 30 is shown wherein the main base member 31 and complementary base member 32 are similarly hingedly connected by means of a snap spring hinge 33. In this embodiment, however, the base member 31 is provided with a single arcuate bore 34 having a flaired distal end 35 and a proximal end in communication with a recess 36 in the complementary base member 32 when the base members are in the closed position. A plate 37 secured to the distal end of the complementary base member 32 pivotally supports the base 38 of an arcuate pin 39 that is automatically directed into the flared end 35 of the bore 34 during the closing movement of the base members. A similar spring limit device 40 having a loop 41 encircling the pin 39 limits the outward pivotal movement of the pin so that it is maintained in proper position at all times for the proper reception within the arcuate bore 34.

It will be recognized that this safety fastener can be used for various other purposes aside from its primary use as a diaper fastener, in any case where such safety and comfort features are desired.

While various changes may be made in the detail construction, it shall be understood that such changes shall be within the spirit and scope of the present invention as defined by the appended claim.

What I claim as new and desire to protect by Letters Patent of the United States is:

A safety fastener comprising a main base member, a complementary base member, hinge means connecting one end of said members together for rotation between open and closed positions, at least one pin pivotally supported upon said complementary base member and normally extending toward the main base member, said main base member having a bore extending longitudinally through said main base member to receive said pin, said bore being of arcuate configuration, said pin being of similar arcuate configuration, the distal end of said bore from said hinge means being widely flared for receiving and guiding said pin during said closing movement of said base members, a spring loop carried by said complementary base member limiting the outward movement of said pin upon said complementary base member, said complementary base member having a recess in communication with the proximal end of said bore relative to said hinge means for receiving the terminal end of said pin therein in said closed position of said base members.

References Cited in the file of this patent

UNITED STATES PATENTS

| 1,077,360 | Mirault | Nov. 4, 1913 |
| 2,667,676 | Sampson | Feb. 2, 1954 |
| 2,833,014 | Graham | May 6, 1958 |

FOREIGN PATENTS

| 689,491 | France | May 27, 1930 |